No. 628,343. Patented July 4, 1899.
W. MENZEL.
FIXING OF INSULATORS FOR CARRYING ELECTRIC LINE WIRES.
(Application filed Feb. 27, 1899.)
(No Model.)
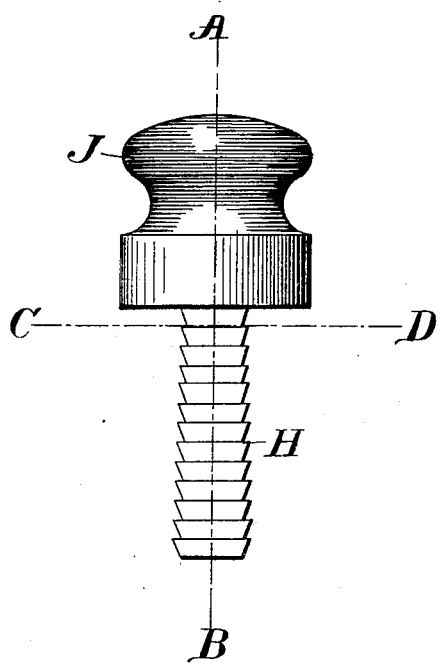
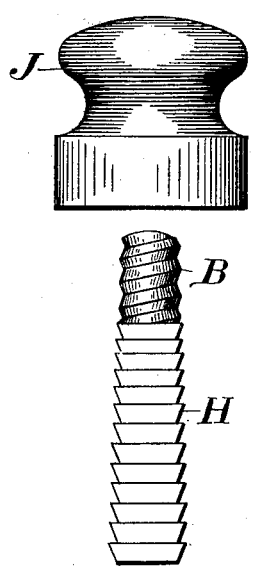
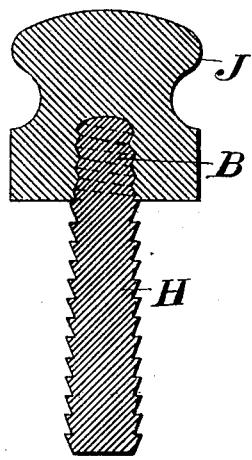
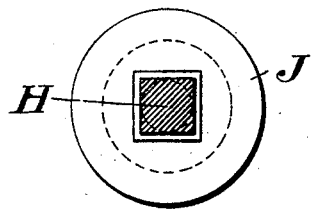

United States Patent Office.

WERNER MENZEL, OF DUSSELDORF, GERMANY.

FIXING OF INSULATORS FOR CARRYING ELECTRIC-LINE WIRES.

SPECIFICATION forming part of Letters Patent No. 628,343, dated July 4, 1899.

Application filed February 27, 1899. Serial No. 707,080. (No model.)

*To all whom it may concern:*

Be it known that I, WERNER MENZEL, manufacturer, a citizen of the German Empire, residing at Dusseldorf, Germany, have invented certain new and useful Improvements in and Relating to the Fixing of Insulators for Carrying Electric-Line Wires; and I do hereby declare the following to be a full, clear, and exact description of the invention, such as will enable others skilled in the art to which it appertains to make and use the same.

My invention relates to the fixation of insulators for carrying electric-line wires; and it consists of improvements in the stem or holder of such insulators by means of which they may be fixed into stone, brick, or other walls with less likelihood of them becoming detached therefrom through oxidation of said stem or holder, as is the case with those in use at the present time.

In order that the said improvements constituting my invention may be fully understood, I have hereunto appended a sheet of drawings, of which—

Figure 1 is a view of an ordinary insulator mounted upon a stem or holder constructed and arranged according to my invention. Fig. 2 is a view illustrating the external appearance of the said stem or holder detached from the said insulating-body. Fig. 3 is a section upon the line A B, while Fig. 4 is a section upon the line C D of Fig. 1.

For the purposes of my invention I construct a stem or holder H of any suitable non-oxidizable metal or alloy of metals or iron or steel galvanized to prevent oxidation, one end of which, B, is provided with an ordinary screw-thread adapted to engage with a like threaded hole formed in the back of the insulator or insulating-body J, the remainder of the stem H being tapered and gradually extended in diameter toward its opposite end, and upon the said tapered portion I form any number of angular grooves, each being in cross-section in the form of a ratchet-tooth or the tooth of a handsaw, the shorter sides of the said groove being at right angles with the plane of the stem H.

In practice the hole formed in the wall or other surface at the point where the insulator or insulating-body J is to be fixed would be preferably of tapered formation, larger than but corresponding to the tapered portion of H and of such depth as to receive the tapered portion only, the space within the said hole outside of the stem or holder H being then grouted or otherwise filled in with Portland cement, gypsum, or plaster-of-paris, lead, or other suitable material, and this, in conjunction with the shape of the hole in the wall or other surface and the circular grooves in H, forms a key, which entirely obviates the possibility of the said stem or holder leaving the said hole until the said cement or other material is chipped or otherwise cut away.

The insulator or insulating-body J may be screwed upon the thread portion B and be thereby fixed in position thereon in the manner indicated by Figs. 1 and 3.

Having now particularly described and ascertained the nature of my said invention and in what manner the same is to be performed, I declare that what I claim is—

1. A stem or pin for insulators, screw-threaded throughout a portion of its length at the end thereof where it engages the insulator, a series of independent angular grooves passing around the body of said pin at right angles to its longitudinal axis and commencing where the screw-threaded portion ends, substantially as described.

2. A stem or pin for insulators, screw-threaded throughout a portion of its length at the end thereof where it engages the insulator; a series of independent angular grooves passing around the body of said pin at right angles to its longitudinal axis, and commencing where the screw-threaded portion ends, said grooves forming teeth having sides of different length, the shorter of which sides are perpendicular to the longitudinal axis of the pin, substantially as described.

3. A stem or pin for insulators, screw-threaded throughout a portion of its length at the end thereof where it engages the insulator, the said pin being cylindrical in cross-section throughout said screw-threaded portion; a series of independent angular grooves passing around the body of said pin at right angles to its longitudinal axis and commencing where the screw-threaded portion ends, said body being rectangular in cross-section throughout said grooved portion, and the said pin being of non-oxidizable material, substantially as described.

In testimony whereof I affix my signature in presence of two witnesses.

WERNER MENZEL.

Witnesses:
ALFRED MULLER,
WILLIAM ESSENWEIN.